United States Patent
Senile et al.

(10) Patent No.: US 8,156,745 B2
(45) Date of Patent: *Apr. 17, 2012

(54) EXHAUST NOZZLE SEAL WITH SEGMENTED BASESHEET

(75) Inventors: Darrell Glenn Senile, Oxford, OH (US); Valentine Robert Boehm, Jr., Cincinnati, OH (US); Bernard James Renggli, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 1084 days.

This patent is subject to a terminal disclaimer.

(21) Appl. No.: 12/040,286

(22) Filed: Feb. 29, 2008

(65) Prior Publication Data
US 2009/0217671 A1 Sep. 3, 2009

(51) Int. Cl.
F02K 1/00 (2006.01)
B63H 11/10 (2006.01)
F16J 15/02 (2006.01)

(52) U.S. Cl. ........ 60/770; 60/771; 239/265.19; 277/637

(58) Field of Classification Search ............. 60/770, 60/771; 239/265.19, 265.39, 265.43; 277/632, 277/637, 650, 654
See application file for complete search history.

(56) References Cited

U.S. PATENT DOCUMENTS

| | | | |
|---|---|---|---|
| 3,979,065 A * | 9/1976 | Madden | 239/127.3 |
| 4,203,286 A * | 5/1980 | Warburton | 60/266 |
| 4,662,566 A * | 5/1987 | Honeycutt, Jr. | 239/265.39 |
| 4,690,330 A * | 9/1987 | Robinson et al. | 239/265.39 |
| 5,000,386 A * | 3/1991 | Lybarger | 239/265.39 |
| 5,039,014 A | 8/1991 | Lippmeier | |
| 5,076,496 A | 12/1991 | Lippmeier | |
| 5,461,856 A * | 10/1995 | Mendia et al. | 60/230 |
| 5,484,105 A * | 1/1996 | Ausdenmoore et al. | 239/127.3 |
| 5,485,959 A | 1/1996 | Wood et al. | |
| 5,584,173 A | 12/1996 | Lybarger | |
| 5,667,140 A | 9/1997 | Johnson et al. | |
| 5,680,755 A | 10/1997 | Hauer et al. | |

(Continued)

FOREIGN PATENT DOCUMENTS
EP 0744544 11/1996
(Continued)

OTHER PUBLICATIONS

European Search Report, EP 09 25 0446, Jun. 7, 2009, 7 pages.

*Primary Examiner* — Ehud Gartenberg
*Assistant Examiner* — Gerald Sung
(74) *Attorney, Agent, or Firm* — William Scott Andes; Steven J. Rosen

(57) ABSTRACT

An aircraft gas turbine engine exhaust nozzle basesheet includes longitudinally extending plurality of basesheet segments. Each of the basesheet segments includes a panel body between segment leading and trailing edges and slidable sealing joints with slidingly un-restrained center surfaces between adjacent segment leading and trailing edges. Segmented first and second basesheet side edges first and second segment side edges of the basesheet segments respectively. Slidably sealingly engaged overlapping flanges at the segment leading and trailing edges include tacked together transversely spaced apart first and second distal ends of the overlapping flanges. Leading and trailing edge ribs supporting the overlapping flanges are clipped together with longitudinally spaced apart and transversely extending forward and aft slits in retainers. A spine includes transverse stiffeners with first and second stiffener distal ends attached to longitudinally spaced apart sets of transversely extending first and second spine tabs of the spine.

24 Claims, 14 Drawing Sheets

U.S. PATENT DOCUMENTS

| | | | |
|---|---|---|---|
| 5,683,034 A * | 11/1997 | Johnson et al. | 239/265.35 |
| 6,471,469 B2 | 10/2002 | Toffan et al. | |
| 6,658,854 B2 | 12/2003 | Senile et al. | |
| 6,739,050 B2 | 5/2004 | Senile et al. | |
| 6,745,570 B2 | 6/2004 | Renggli et al. | |
| 6,935,118 B2 | 8/2005 | Gould et al. | |
| 6,983,602 B2 | 1/2006 | Senile | |
| 7,013,650 B2 * | 3/2006 | Mandet | 60/771 |
| 7,624,579 B2 * | 12/2009 | Peters | 60/771 |
| 2003/0145599 A1 * | 8/2003 | Renggli et al. | 60/771 |
| 2003/0145600 A1 * | 8/2003 | Senile et al. | 60/771 |

FOREIGN PATENT DOCUMENTS

| | | |
|---|---|---|
| EP | 1544448 | 6/2005 |
| GB | 2230299 | 10/1990 |

* cited by examiner

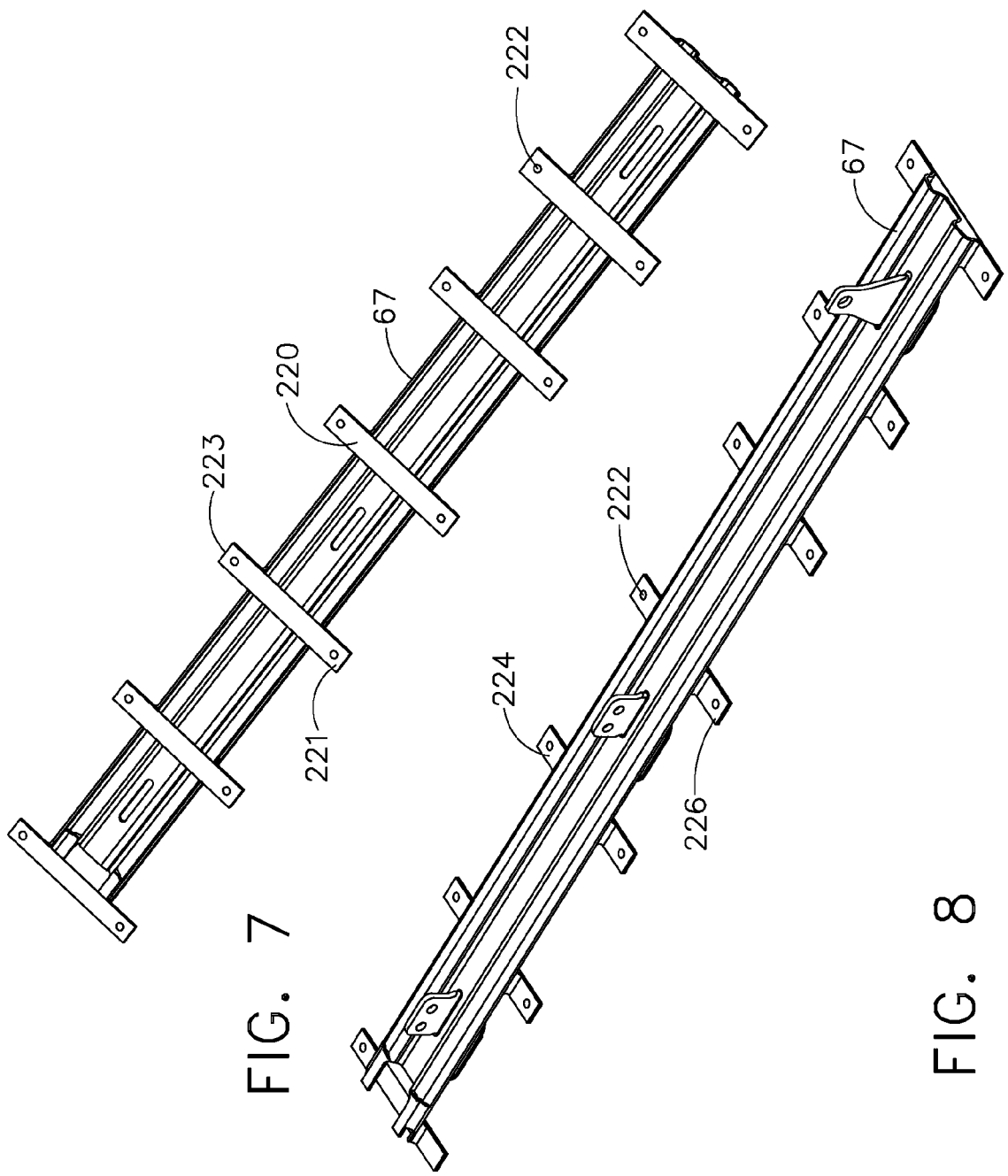

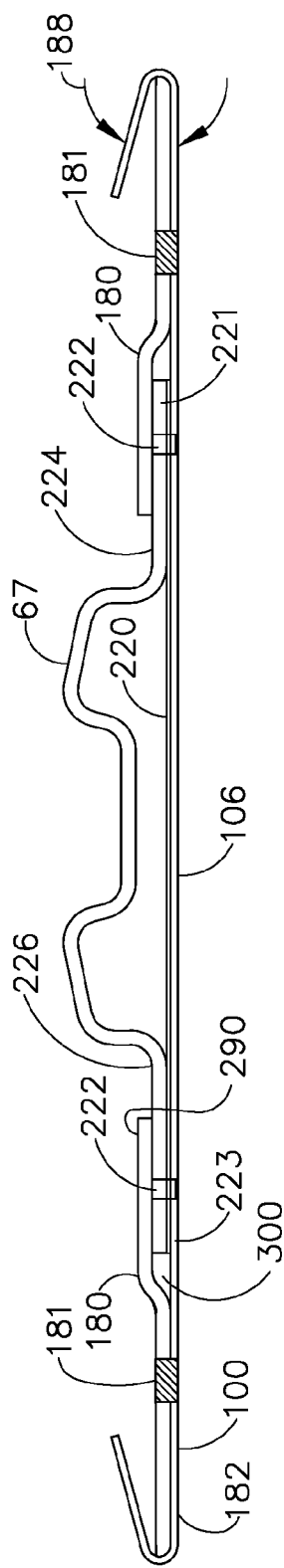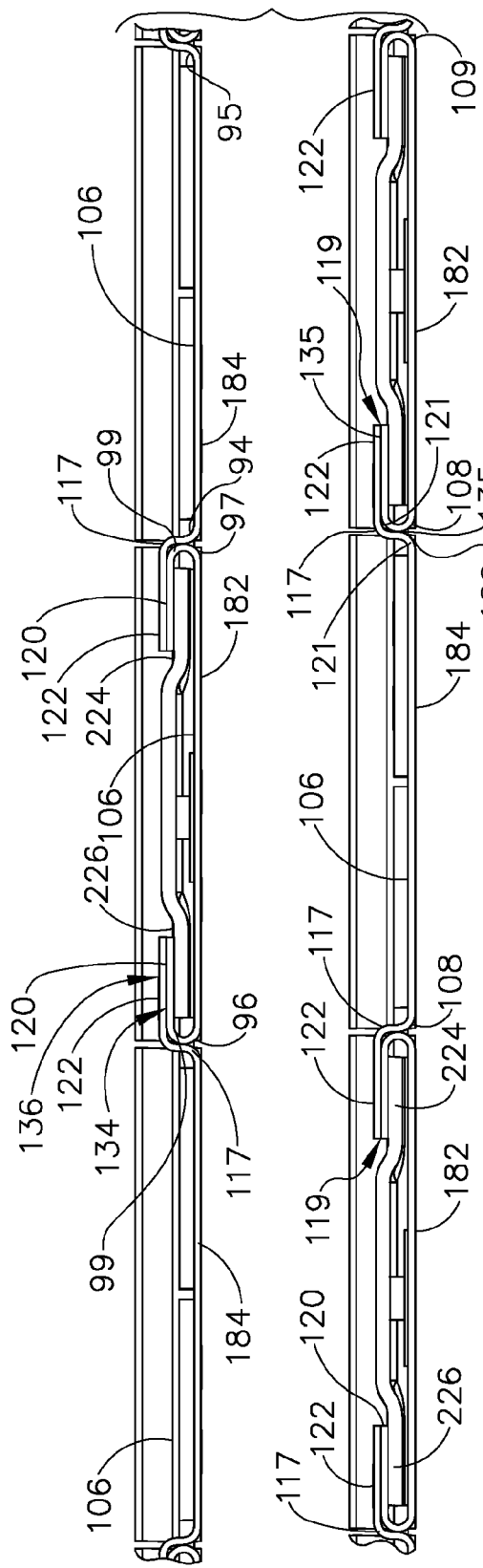

EXHAUST NOZZLE SEAL WITH SEGMENTED BASESHEET

BACKGROUND OF THE INVENTION

1. Field of the Invention

This invention relates generally to gas turbine engine exhaust nozzles and, more particularly, to gas turbine engine exhaust nozzle seals with segmented basesheets.

2. Description of Related Art

Military aircraft gas turbine engines often include variable geometry exhaust nozzles. The variable geometry exhaust nozzle varies throat and exit areas of the exhaust nozzle using flaps and seals. Examples of such engines are the General Electric F110 and the F414. The flaps and seals define the flowpath and the seals, as their name implies, seal against adjacent flaps. Because the exhaust nozzles are subjected to high temperatures and thermal gradients as a result of hot combustion gases exiting the engine, the variable geometry nozzle must maintain a coherent flowpath while shielding nozzle structural components.

Nozzle divergent flaps and seals incorporating backbones to secure the basesheets have been used for the divergent section of convergent/divergent variable geometry nozzles. A flowpath surface of the seal basesheet is exposed to hot combustion gases in an exhaust stream of the nozzle, while a backside of the seal is in a cooler environment. The temperature differential causes distortion and premature wear fatigue failure. It is desirable to have good sealing between the divergent seal and its adjacent flaps, while allowing for movement in the axial or longitudinal direction, while restraining the basesheet segments in the radial and transverse directions to eliminate the cause of distortion in the radial direction. It is desirable for longitudinally adjacent segments to allow local movement relative to each other due to thermal differential between the flowpath surface and the backside along with the thermal differential between the centerline and the axial edges. It is desirable for the segmented design to free up the center of the seal between the segments, so the movement does not accumulate over the length of the seal or cause distortion leading to premature wear or fatigue, while still providing good sealing with the adjacent flaps.

BRIEF SUMMARY OF THE INVENTION

An aircraft gas turbine engine exhaust nozzle basesheet includes a longitudinally extending plurality of basesheet segments. Each of the basesheet segments includes a panel body extending between longitudinally spaced apart segment leading and trailing edges and transversely spaced apart first and second segment side edges. Segmented first and second basesheet side edges are formed by the first and second segment side edges, respectively. Slidable sealing joints with slidingly un-restrained center surfaces are located between adjacent ones of the segment leading and trailing edges.

An exemplary embodiment of the basesheet includes slidably sealingly engaged overlapping flanges at the adjacent ones of the segment leading and trailing edges. Transversely spaced apart first and second distal ends of the overlapping flanges are tacked together. Leading and trailing edge ribs support the overlapping flanges at the adjacent ones of the segment leading and trailing edges respectively. Forward and aft pairs of the leading and trailing edge ribs are received within and clipped together by forward and aft slits respectively of retainers. The retainers include a substantially flat retainer base having the longitudinally spaced apart and transversely extending forward and aft slits. Transversely spaced apart first and second segment side edges of the inwardly and outwardly bent segments form the first and second basesheet side edges respectively. Inwardly bent over first and second segment tabs are formed along the first and second segment side edges respectively. Gaps between the adjacent ones of the leading and trailing edge ribs accommodate longitudinal thermal growth of the adjacent ones of the inwardly and outwardly bent segments of the basesheet.

The basesheet may be incorporated in an aircraft gas turbine engine exhaust nozzle basesheet assembly including the basesheet mounted to a longitudinally extending spine. Transverse stiffeners includes first and second stiffener distal ends attached to longitudinally spaced apart sets of transversely extending first and second spine tabs of the spine. The first and second spine tabs are secured to a first plurality of the panel bodies. The first and second stiffener distal ends and the sets of first and second spine tabs may be trapped in pockets formed in islands of the retainers, longitudinally located between the forward and aft slits and the first plurality of the panel bodies. The pockets may be within raised indentations of inboard end portions of the islands.

An exemplary embodiment of the exhaust nozzle basesheet assembly includes longitudinally spaced apart forward, center, and aft slots in the spine. Forward, center, and aft hangers include lug portions extending substantially perpendicularly upwardly from hanger heads of the hangers. The lug portions of the forward, center, and aft hangers extend through the forward, center, and aft slots respectively. The hanger heads are disposed and retained between the basesheet and the spine. The lug portions of the forward and center hangers include forward and center retaining hooks respectively.

Another exemplary embodiment of the exhaust nozzle basesheet assembly includes the longitudinally extending basesheet mounted to the longitudinally extending spine and the spine mounted to a longitudinally extending backbone. A more particular embodiment includes the backbone having longitudinally spaced apart forward, center, and aft attachment locations. The forward and center retaining hooks engage forward and center shelves at the forward and center attachment location. The lug portion of the aft hanger is connected to the backbone at the aft attachment location.

BRIEF DESCRIPTION OF THE DRAWINGS

The foregoing aspects and other features of the invention are explained in the following description, taken in connection with the accompanying drawings where:

FIG. 7 is an upwardly looking perspective view illustration of a spine of the basesheet assembly illustrated in FIG. 5.

FIG. 8 is a downwardly looking perspective view illustration of the spine and lugs of the basesheet assembly illustrated in FIG. 5.

FIG. 10 is a transverse cross-sectional view illustration of an intermediate section of a spine supporting the basesheet of the basesheet assembly illustrated and taken along line 10-10 in FIG. 4.

FIG. 11 is a longitudinal cross-sectional view illustration of adjacent segments of the basesheet of the basesheet assembly illustrated and taken along line 11-11 in FIG. 4.

DETAILED DESCRIPTION OF THE INVENTION

Figure 1:
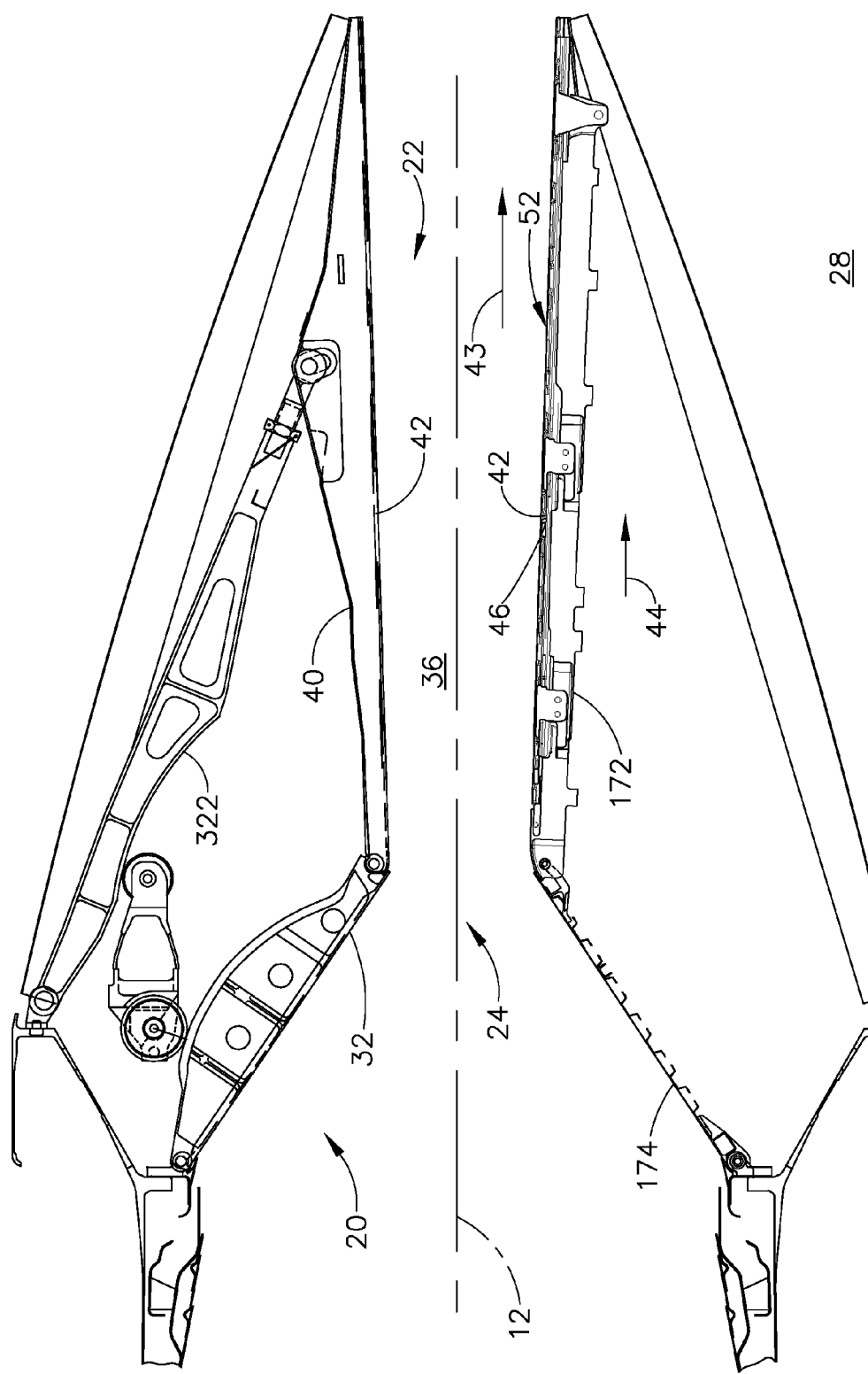
FIG. 1 is a cross-sectional schematic view illustration of a gas turbine engine variable exhaust nozzle.

Illustrated in FIG. 1 is a gas turbine engine variable geometry exhaust nozzle 28 including a convergent and divergent sections 20, 22 circumscribing an axis 12 and defining a throat 24 therebetween. The exhaust nozzle 28 includes convergent flaps 32 and convergent seals 174 in the convergent section 20 and divergent flaps 40, rotated by struts 322, and divergent seals 172 in the divergent sections 22. Flowpath sides 42 of basesheets 52 of the divergent seals 172 are exposed to a hot exhaust gas flow 43 exiting the exhaust nozzle 28 and, thus, the flowpath sides 42 define a portion of a flowpath 36 through the nozzle. Cold sides 46 of the basesheets 52 (also see FIG. 3) are opposite to the flowpath sides 42 and are exposed to a much cooler environment indicated by a cooling flow 44. The temperature differential can cause distortion and can lead to premature wear fatigue failure of the seals and more particularly of the basesheets 52.

Figure 2:
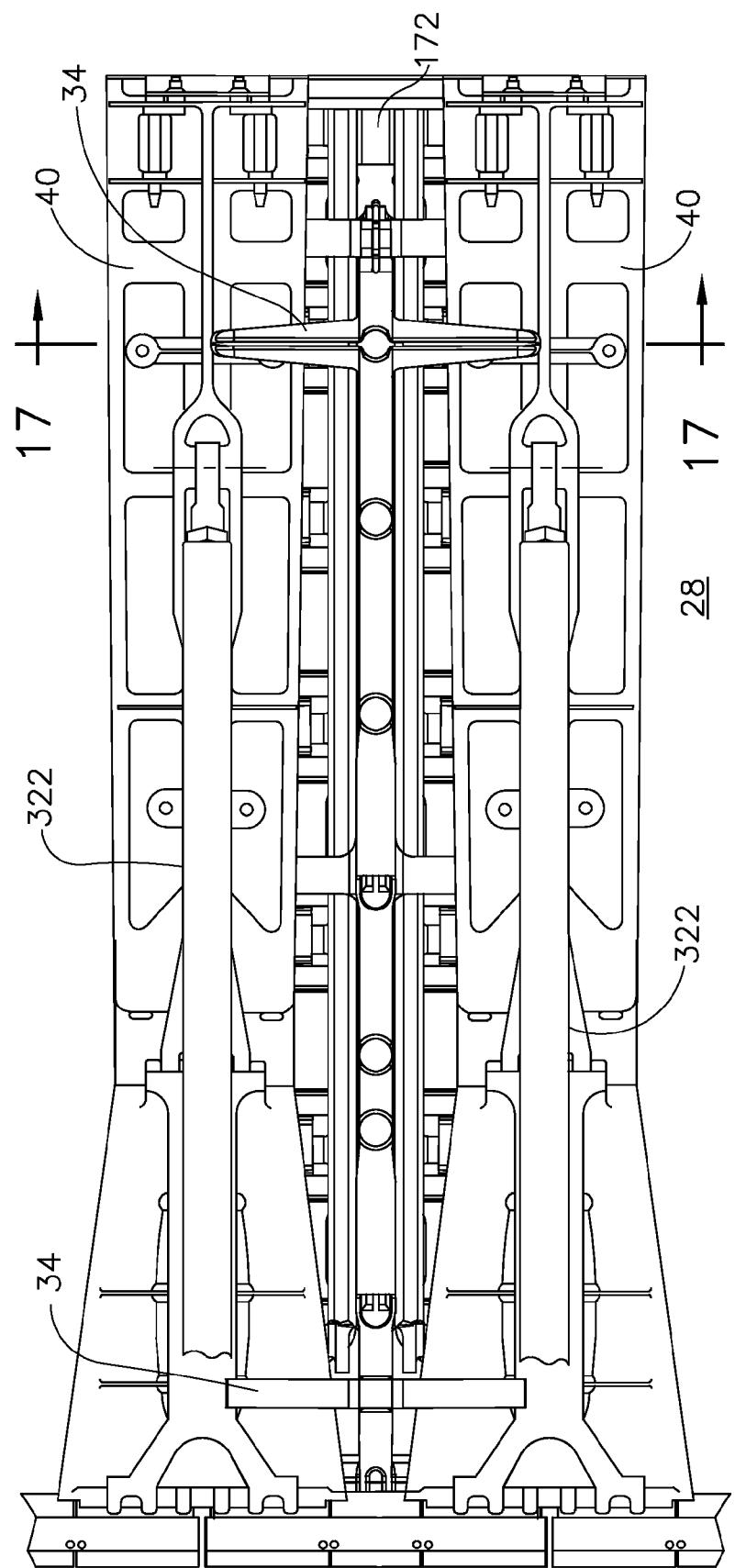
FIG. 2 is a radially inwardly looking planform view illustration of flaps and a seal in the nozzle illustrated in FIG. 1.

The divergent seals 172 are hung onto and supported by the divergent flaps 40 with the use of angel wing hangers 34 as illustrated in FIG. 2. Longitudinally spaced apart sets of forward and aft vibration dampeners 228, 230 extend transversely away from and outboard with respect to the longitudinally extending backbone 50. The vibration dampeners are sprung to engage a back side 107 of the basesheet 52. The divergent seals 172 seal against the divergent flaps 40.

Figure 3:
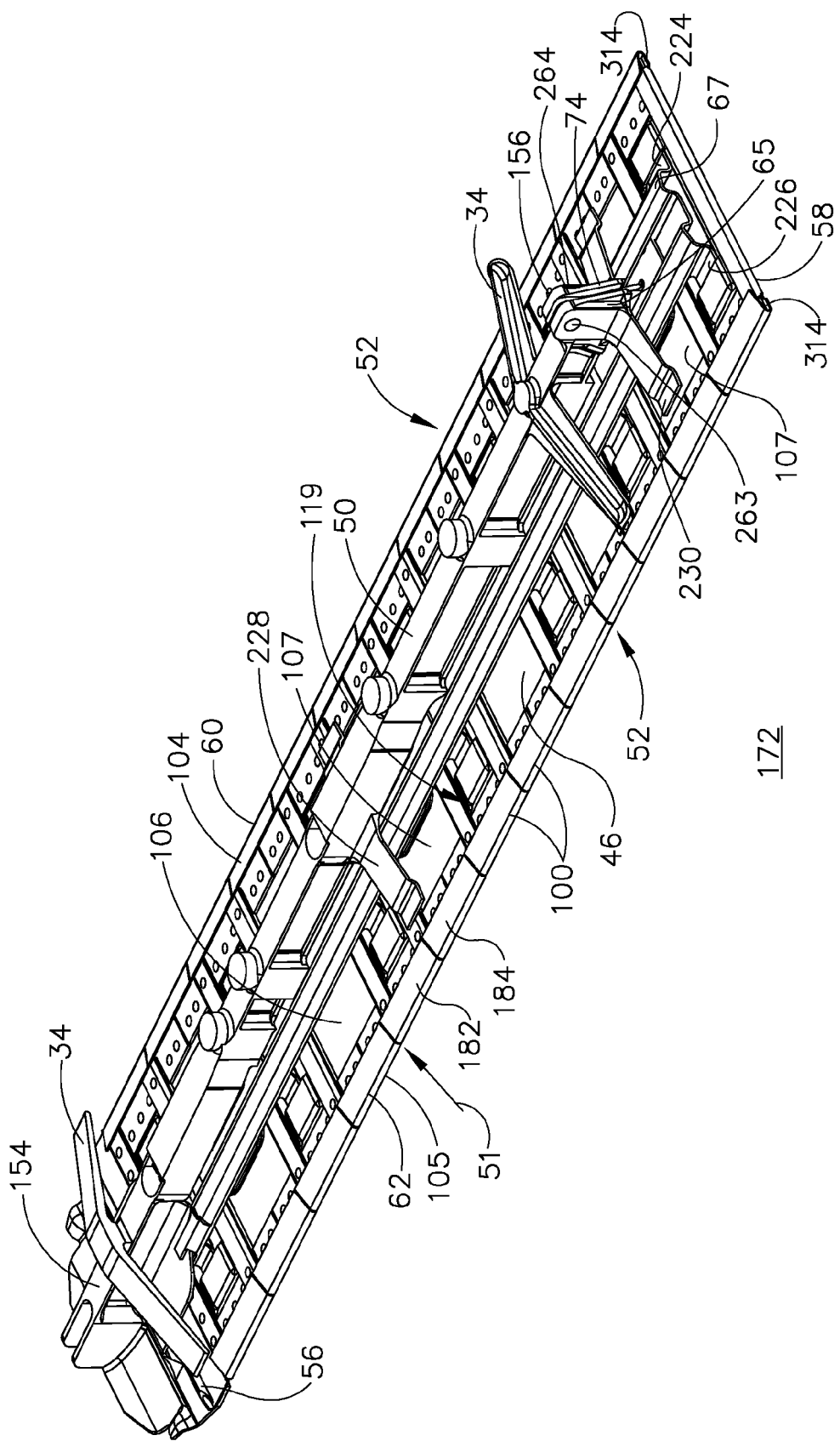
FIG. 3 is a perspective view illustration of a basesheet assembly of the divergent seal illustrated in FIGS. 1 and 2.
Figure 4:
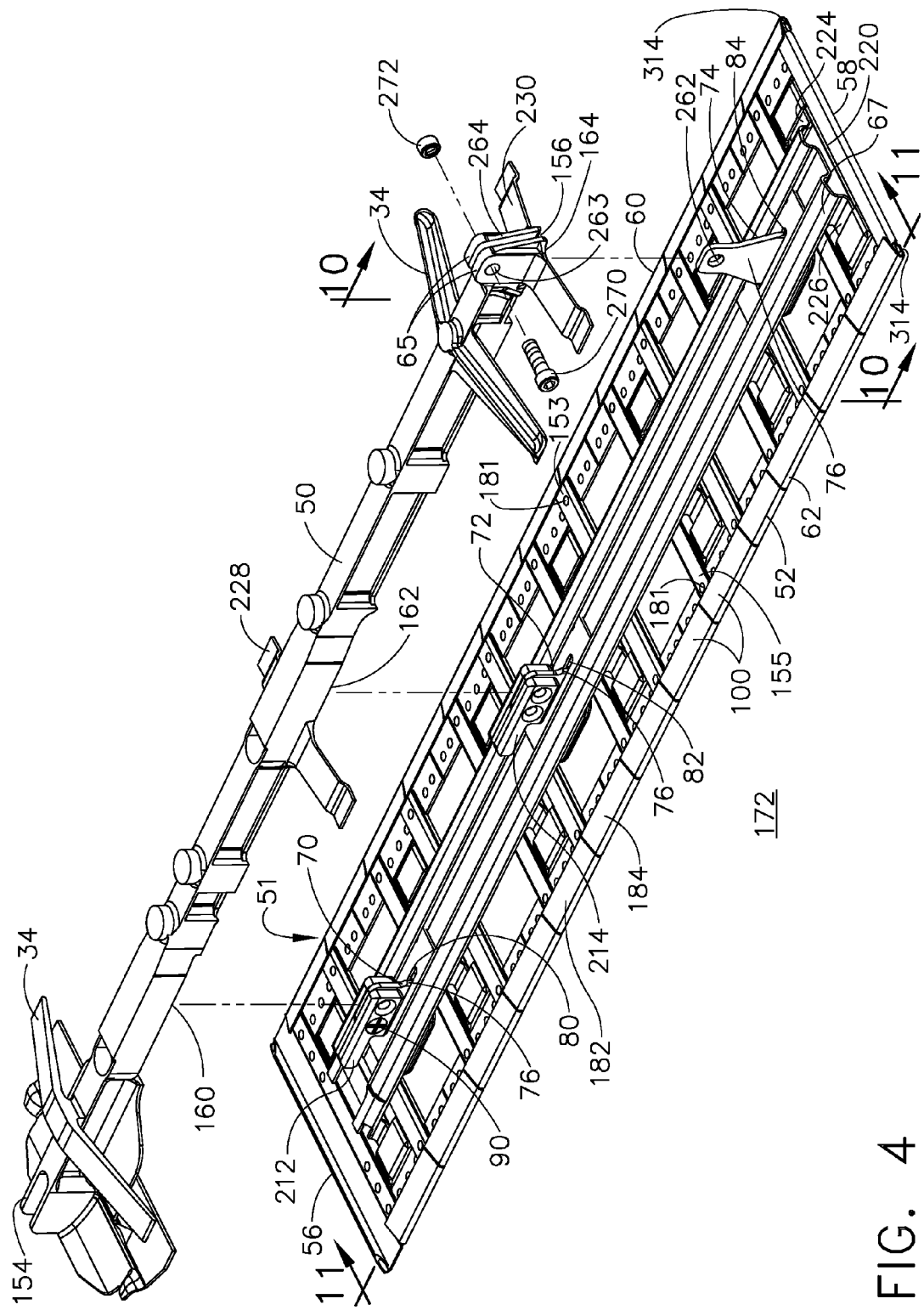
FIG. 4 is a partially exploded perspective view illustration of the basesheet assembly of the divergent seal illustrated in FIGS. 1 and 2.
Figure 6:
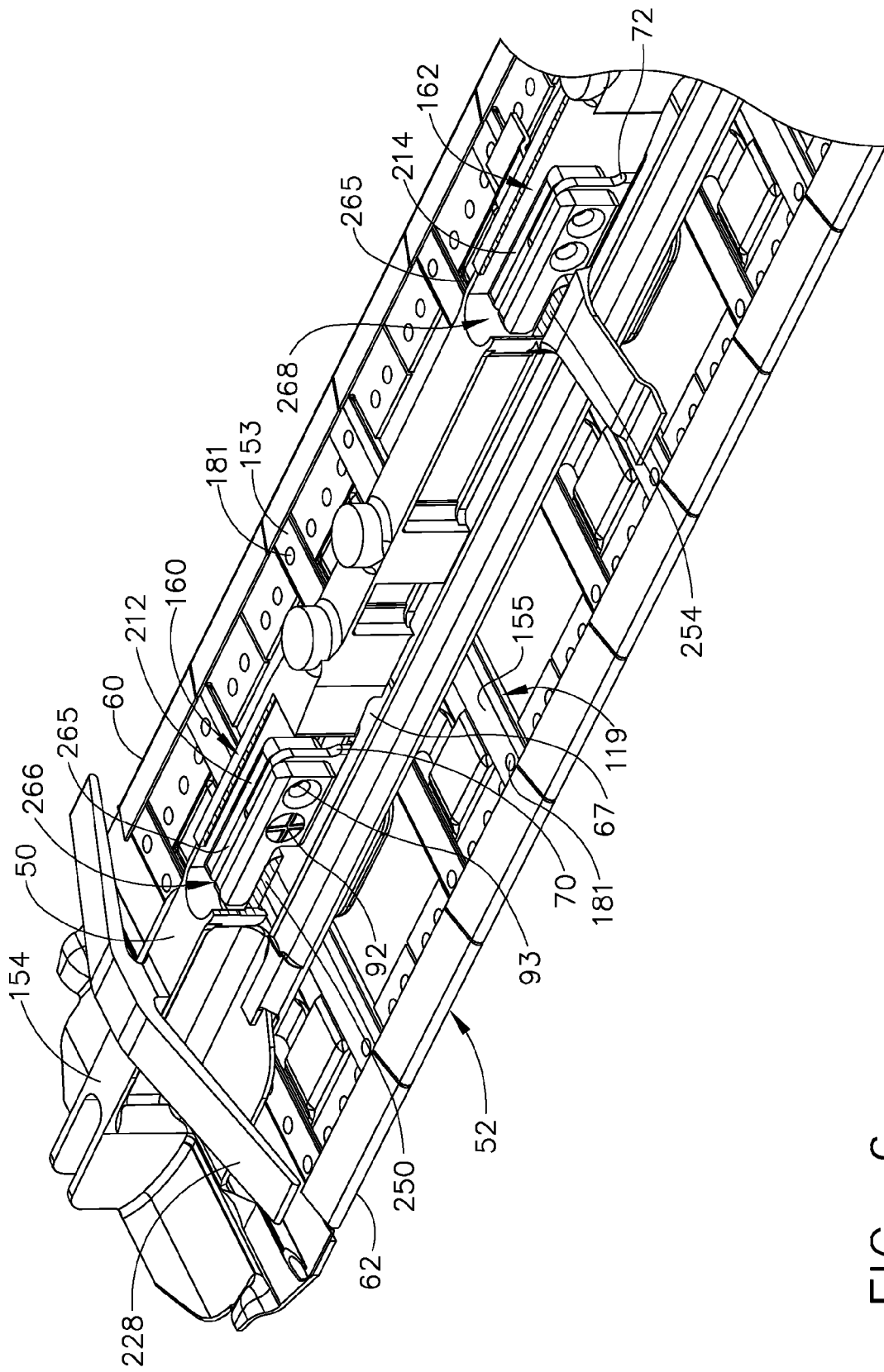
FIG. 6 is a partially cut away perspective view illustration of hooks supporting a basesheet of the basesheet assembly by engaging shelves of the backbone of the basesheet assembly illustrated in FIGS. 3 and 4.

Illustrated in FIG. 3 and in a partially exploded view in FIG. 4 is the divergent seal 172 having a longitudinally extending backbone 50 supporting a basesheet assembly 51 including the basesheet 52. The backbone 50 extends longitudinally from a forward end 154 to an aft end 156. The backbone 50 includes longitudinally spaced apart forward, center, and aft attachment locations 160, 162, and 164 respectively. The center attachment location 162 is located axially between the forward attachment location 160 and the aft attachment location 164. Illustrated in FIG. 6 are forward and center shelves 250, 254 at the forward and center attachment locations 160, 162, respectively, that are used to frictionally secure a longitudinally extending spine 67 to the backbone 50. The basesheet 52 is mounted to the spine 67. The forward and center shelves extend radially inward from a sidewall 265 into a forward and center opening 266, 268, respectively, defined by the sidewall 265.

Figure 5:
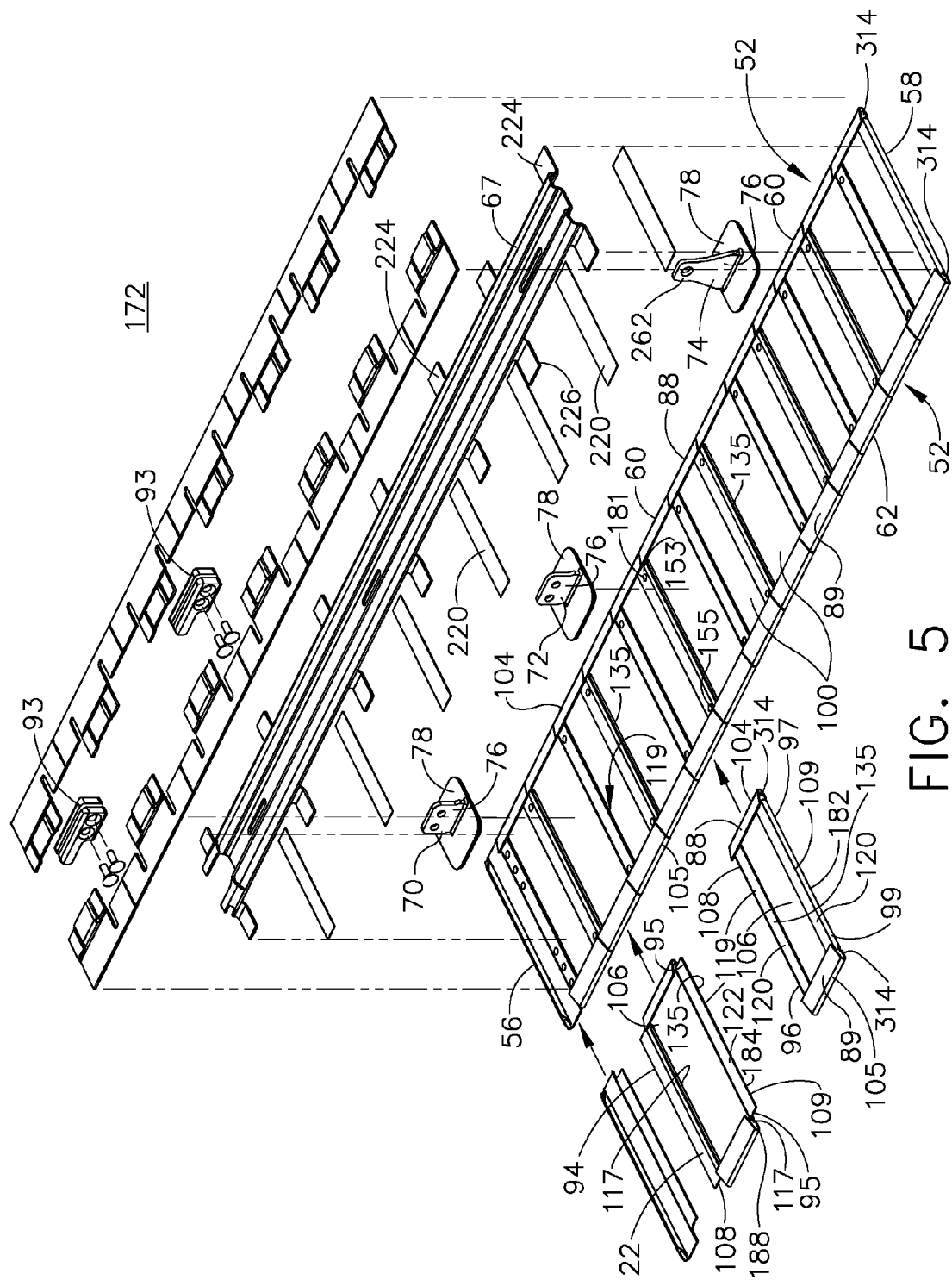
FIG. 5 is an exploded perspective view illustration of the basesheet assembly illustrated in FIGS. 1 and 2.

Referring to FIGS. 3, 4, and 5, forward, center, and aft hangers 70, 72, and 74 are used to mount the basesheet 52 and the spine 67 to the backbone 50. The hangers have lug portions 76 extending substantially perpendicularly upwardly from substantially flat hanger heads 78 through narrow longitudinally spaced apart forward, center, and aft slots 80, 82, and 84 in the spine 67. The hanger heads 78 are disposed and retained between the basesheet 52 and the spine 67. The forward and center hangers 70, 72 have forward and center retaining hooks 212, 214 mounted to their respective lug portions 76 by fasteners 90 illustrated herein as screws 92 retained in threaded holes 93 as more particularly illustrated in FIG. 6.

The forward, center, and aft hangers 70, 72, and 74 are also used to mount the basesheet 52 and its spine 67 to the backbone 50. The forward and center retaining hooks 212, 214 frictionally engage the forward and center shelves 250, 254, respectively, so that the hooks are a longitudinal spaced apart from the sidewall 265. Referring to FIGS. 3, 4, 5, and 13, the lug portion 76 of the aft hanger 74 has a first aperture 262 and is disposed in a clevis 264 of the backbone 50 at the aft attachment location 164. The clevis 264 has two arms 65 having second apertures 263 that are aligned with the first aperture 262 when the spine 67 is in an installed position so as to receive a fastener such as screw 270 secured by a nut 272 to provide axial or longitudinal retention of the spine 67 to the backbone 50 to prevent the forward and center retaining hooks 212, 214 from axially disengaging from the forward and center shelves 250, 254, respectively.

Referring to FIG. 3, the basesheet 52 has first and second basesheet side edges 60, 62, respectively, extending longitudinally between spaced apart basesheet leading and trailing edges 56, 58. The basesheet 52 is mounted to the spine 67 by transversely extending first and second spine tabs 224, 226 on the spine 67 as more particularly illustrated in FIGS. 8, 10, 11, and 14. In the exemplary embodiment, the basesheet side edges 60, 62 are tapered down in the forward or upstream direction from the basesheet trailing edge 58 to the basesheet leading edge 56. Alternatively, the basesheet side edges 60, 62 may be substantially parallel, and the basesheet leading and trailing edges 56, 58, respectively, may be substantially parallel, and substantially perpendicular with respect to the basesheet side edges 60, 62. The divergent seals 172 seal against the divergent flaps 40 along the basesheet side edges 60, 62.

The basesheet 52 is constructed from a plurality of basesheet segments 100 connected together by retainers 180 and mounted to the spine 67 as more particularly illustrated in FIGS. 3-5. There are two types of basesheet segments 100 in the exemplary embodiment of the basesheet 52, an inwardly bent segment 182 and an outwardly bent segment 184, they are distinguished from each other by the way flanges are bent at leading and trailing edges of the segments as described below. The inwardly and outwardly bent segments 182, 184 alternate longitudinally along the basesheet 52. The basesheet segments 100 are fabricated from a metallic material in the embodiment illustrated herein but may otherwise be fabricated from different materials such as a silicon-carbon graphite material. The basesheet segments 100 are connected together, as described below, and extend between the basesheet leading and trailing edges 56, 58, respectively, and between basesheet side edges 60, 62.

Each of the basesheet segments 100 has a panel body 106 defined between a pair of transversely spaced apart and substantially parallel first and second segment side edges 104, 105 longitudinally extending between segment leading and trailing edges 108, 109, respectively. Inwardly bent over first and second segment tabs 88, 89 are formed along the first and second segment side edges 104, 105. The inwardly bent over first and second segment tabs 88, 89 are bent inwardly over and forming an acute angle 188 with the panel body 106. The inwardly and outwardly bent segments 182, 184 alternate longitudinally along the basesheet 52. The divergent seals 172 seal against the divergent flaps 40 along the basesheet side edges 60, 62 and, thus, the divergent seals 172 seal against the divergent flaps 40 along the first and second segment side edges 104, 105 and the first and second segment side edges 104, 105 are segmented.

Referring to FIGS. 3-5 and 11, the inwardly bent segments 182 have leading and trailing edge inwardly bent ribs 96, 97, respectively, and are bent inwardly over the panel body 106. The leading and trailing edge inwardly bent ribs 96, 97, which are substantially 180 degree bends, support inwardly bent over flanges 120 that are formed integrally with the panel body 106 at the segment leading and trailing edges 108, 109. The inwardly bent over flanges 120 are positioned over, spaced apart from, and substantially parallel to the panel body 106 forming channels 99 therebetween. The outwardly bent segment 184 has leading and trailing edge outwardly bent ribs 94, 95, respectively, bent outwardly and longitudinally away from the panel body 106. The leading and trailing edge outwardly bent ribs 94, 95 include jogs 117 supporting outwardly bent over flanges 122 that are substantially parallel to the panel body 106 of the outwardly bent segment 184 at the segment leading and trailing edges 108, 109. The jogs 117 have substantially ninety degree bends 121 and the outwardly bent over flanges 122 are positioned longitudinally away from and substantially parallel to the panel body 106 and formed integrally with the panel body 106 at the segment leading and trailing edges 108, 109 of the outwardly bent segment 184.

Figure 16:
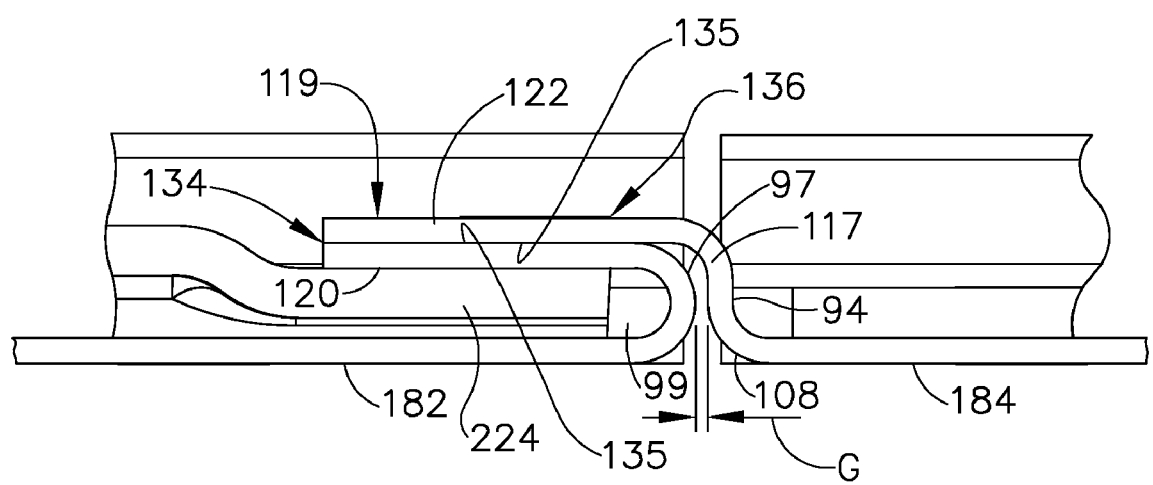
FIG. 16 is an enlarged longitudinal cross-sectional view illustration of a portion of the adjacent segments of the basesheet of the basesheet assembly illustrated in FIG. 11.

Slidable sealing joints 134 with slidingly un-restrained center surfaces 135 are disposed at adjacent ones of the segment leading and trailing edges 108, 109 and between adjacent ones of the inwardly and outwardly bent segments 182, 184 of the basesheet 52 illustrated herein as overlap or shiplap joints 136. The shiplap joints 136 include overlapping flanges 119 and in slidably sealing engagement and, more particularly, the outwardly bent over flanges 122 of the outwardly bent segments 184 overlapping and in slidably sealing engagement with the inwardly bent over flanges 120 of the inwardly bent segments 182. The slidingly un-restrained center surfaces 135 are disposed between transversely spaced apart first and second distal ends 153, 155 of the overlapping outwardly bent over flanges 122 as illustrated in FIGS. 5 and 16. The slidable sealing joints 134 and, more particularly, shiplap joints 136 allow the adjacent ones of the inwardly and outwardly bent segments 182, 184 to move relative to each other without distorting due to temperature differentials. Gaps G are provided between the adjacent ones of the leading and trailing edge ribs 94, 95, 96, 97 to accommodate longitudinal thermal growth of the adjacent ones of the inwardly and outwardly bent segments 182, 184 of the basesheet 52. During assembly of the inwardly and outwardly bent segments 182, 184 to the basesheet 52 the gaps G are set with spacers. An example of the dimension of the gap G is 0.025 inches with a plus or minus tolerance of 0.010 inches for a sheet metal thickness of the inwardly and outwardly bent segments 182, 184 being about 0.020 inches.

The seal basesheet flowpath surface is exposed to the combustion gases in the exhaust stream, while the backside of the seal is in a cooler environment. The temperature differential causes distortion and premature wear fatigue failure. The secondary backbone stiffener allows movement in the axial direction, while restraining the basesheet segments in the radial and transverse directions, thus, eliminating the cause of distortion in the radial direction. The segments allow local movement relative to each other due to thermal differential between the flowpath surface and the backside along with the thermal differential between the centerline and the axial edges. The segmented design frees the center of the seal between the segments so the movement does not accumulate over the length of the seal or cause distortion leading to premature wear or fatigue while still providing good sealing with the adjacent flaps.

Figure 9:
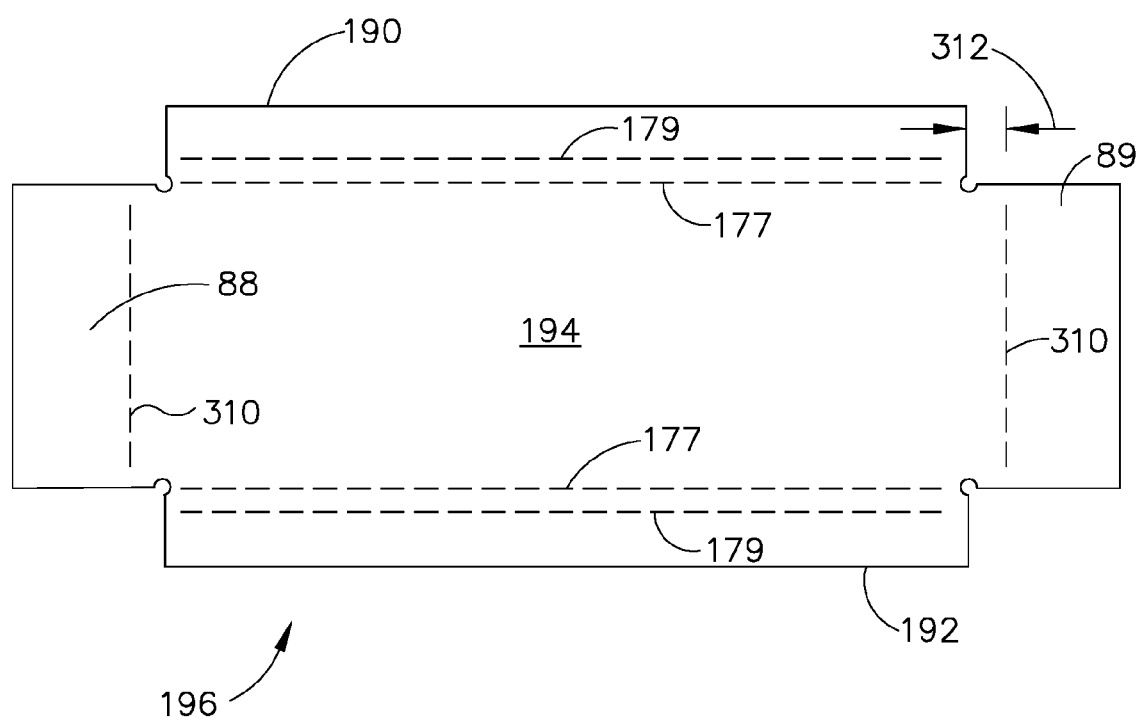
FIG. 9 is a top view illustration of a blank from which segments of the basesheet illustrated in FIG. 5.

Illustrated in FIG. 9 is a blank 196 having first and second bend lines 177, 179 along forward and aft tabs 190, 192 extending away from a central portion 194 of the blank 196. The inwardly and outwardly bent segments 182, 184 are formed by first bending the forward and aft tabs 190, 192 ninety degrees along the first bend lines 177 so that the tabs extend away from and perpendicular to the central portion 194 of the blank 196. The forward and aft tabs 190, 192 for the inwardly bent segments 182 are bent ninety degrees along the second bend lines 179 and inwardly over the central portion 194 of the blank 196 to form the inwardly bent over flanges 120 at the segment leading and trailing edges 108, 109 of the inwardly bent segments 182. The forward and aft tabs 190, 192 for the outwardly bent segments 184 are bent ninety degrees along the second bend lines 179 and away from the central portion 194 of the blank 196 to form the outwardly bent over flanges 122 at the segment leading and trailing edges 108, 109 of the outwardly bent segments 184.

Adjacent ones of the alternating inwardly and outwardly bent segments 182, 184 are arranged such that the outwardly bent over flanges 122 of the outwardly bent segments 184 overlap inwardly bent over flanges 120 of the adjacent inwardly bent segments 182. The transversely spaced apart first and second distal ends 153, 155 of the overlapping outwardly bent over flanges 122 are attached or, more particularly, tacked together such as by spot welding as illustrated by spot welds 181, one of the spot welds 181 at each of the spaced apart first and second distal ends 153, 155, in FIGS. 5 and 14.

Figure 14:
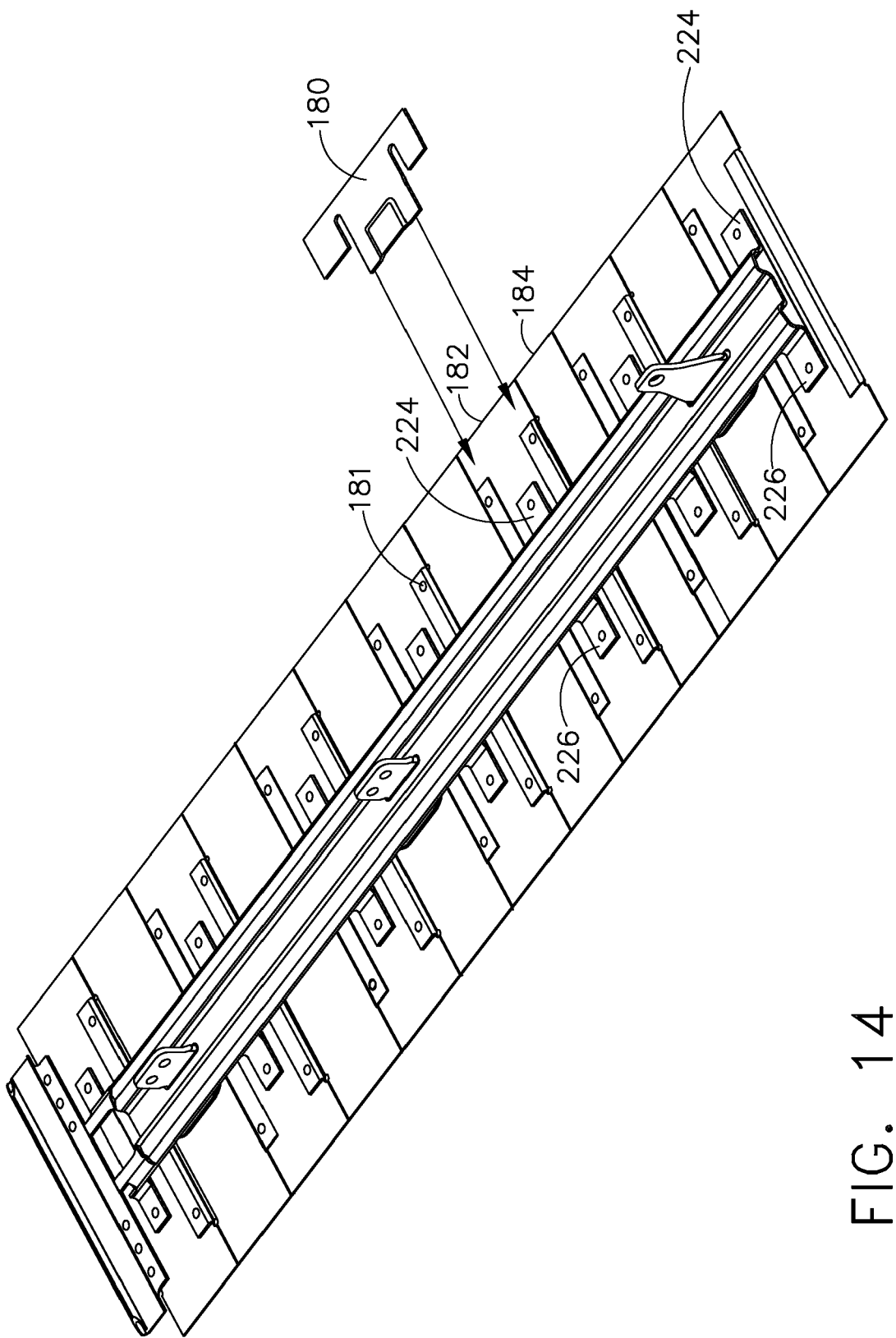
FIG. 14 is a perspective view illustration of the retainer sliding into and clipping together the adjacent segments illustrated in FIG. 4.

Referring to FIGS. 4, 5, 7, 10, and 11, the spine 67 has transverse stiffeners 220 with first and second stiffener distal ends 221, 223 spot welded, illustrated by spot welds 222, to longitudinally spaced apart sets of the first and second spine tabs 224, 226 respectively of the spine 67. Before the inwardly bent over first and second segment tabs 88, 89 are bent and formed, adjacent basesheet segments 100 are securely connected together to assemble the basesheet 52. The retainers 180 secure the first and second spine tabs 224, 226 of the spine 67 to the basesheet 52. Installation of the retainer 180 to connect adjacent inwardly and outwardly bent segments 182, 184 to form the basesheet 52 is illustrated in FIG. 14 and the retainer 180 is more particularly illustrated in FIG. 12.

Figure 12:
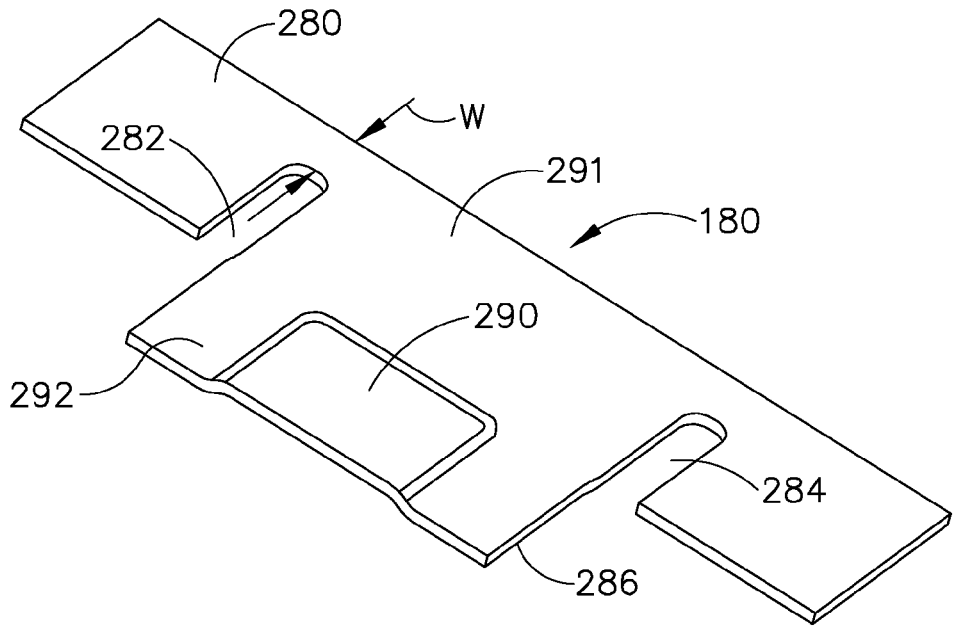
FIG. 12 is a perspective view illustration of a retainer used to clip together the adjacent segments illustrated in FIG. 4.
Figure 13:
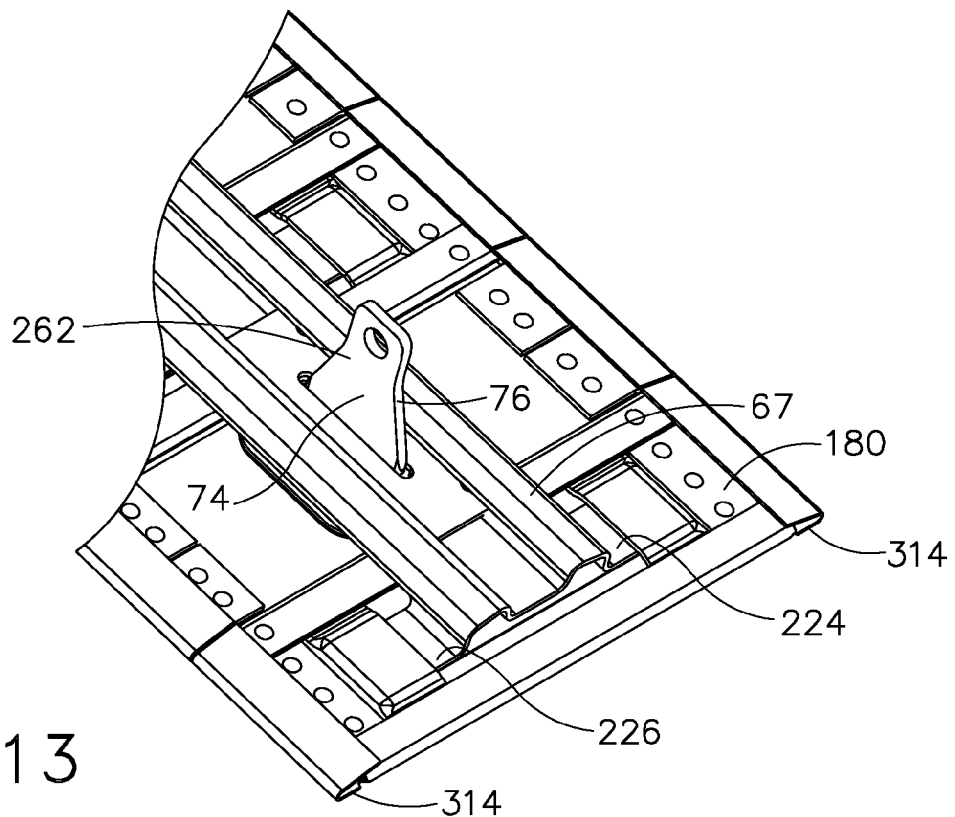
FIG. 13 is a perspective view illustration of a an aft end of the basesheet assembly illustrated in FIG. 4.

The retainer 180, as illustrated in FIG. 12, includes a substantially flat retainer base 280 with longitudinally spaced apart and transversely extending forward and aft slits 282, 284. An island 286 longitudinally disposed between the forward and aft slits 282, 284 extends transversely away from a bridge 291 of the retainer base 280. A raised indentation 290 is formed in an inboard end portion 292 of the island 286. As illustrated in FIG. 14, the retainer 180 is designed to be slid transversely so that the forward and aft slits 282, 284 receive and clip together the leading and trailing edge inwardly bent ribs 96, 97 and the leading and trailing edge outwardly bent ribs 94, 95 of the inwardly and outwardly bent segments 182, 184, respectively, when the basesheet 52 is assembled.

The assembly is also designed such that the island 286 is transversely disposed within the inwardly bent segment 182. The basesheet 52 is attached to the spine 67 with the forward, center, and aft hangers 70, 72, and 74 disposed through their respective forward, center, and aft slots 80, 82, and 84 in the spine 67. The first and second spine tabs 224, 226 with the transverse stiffeners 220 spot welded to them are placed on the panel bodies 106 of the inwardly bent segments 182. Then the retainers 180 are slid into the inwardly bent segments 182 with the island 286 longitudinally disposed between the leading and trailing edge inwardly bent ribs 96, 97 and the raised indentations 290 are transversely aligned with the first and second spine tabs 224, 226.

Figure 15:
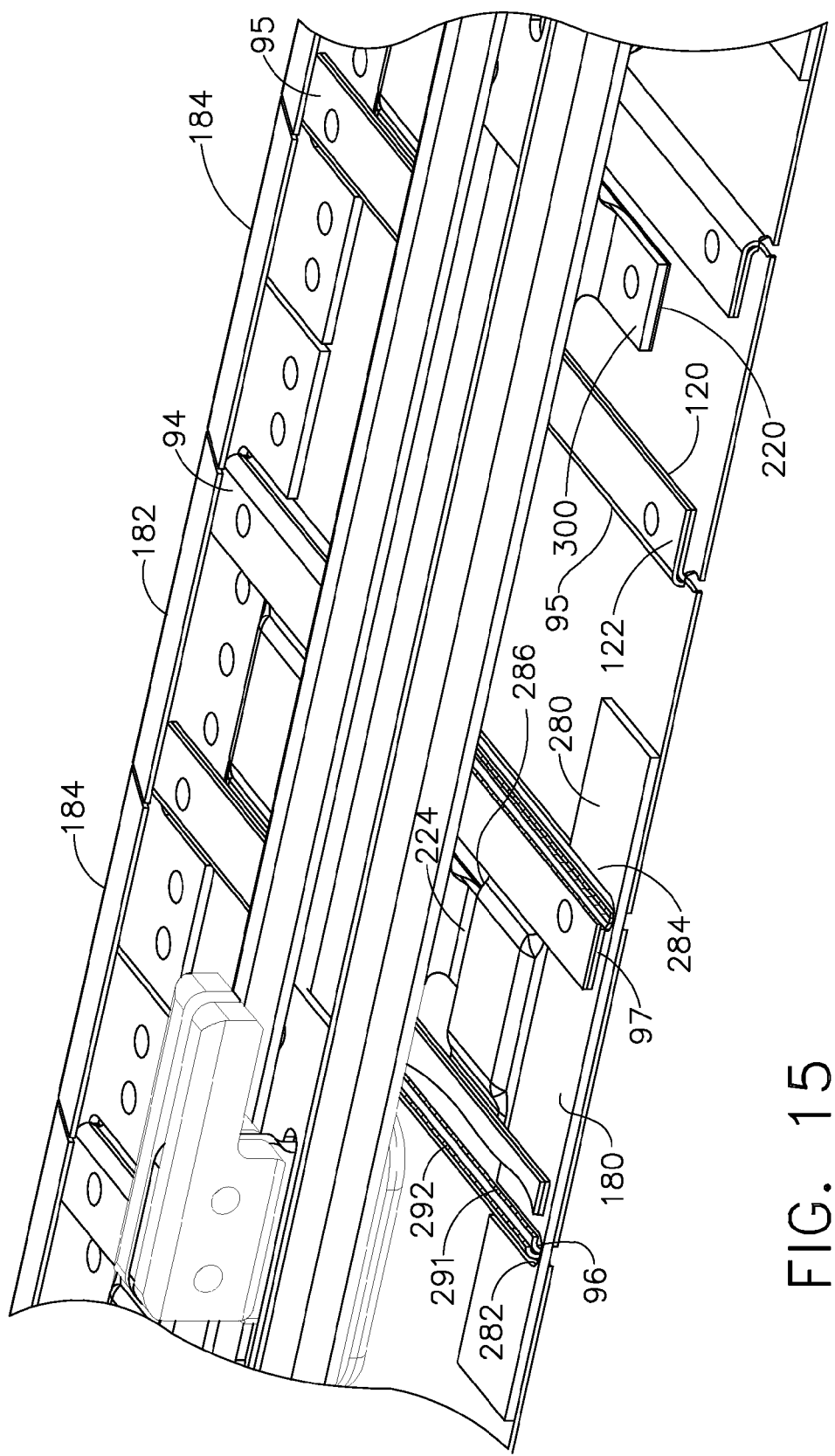
FIG. 15 is a perspective view illustration of the retainer slid in place clipping together the adjacent segments illustrated in FIG. 14.

When the retainers 180 are slid transversely into the inwardly bent segments 182, the first and second spine tabs 224, 226 with the transverse stiffeners 220 with the first and second stiffener distal ends 221, 223 attached slide into and are trapped in pockets 300 between the raised indentations 290 of the retainers 180 and the panel bodies 106 of the inwardly bent segments 182 as illustrated in FIG. 15. The first and second spine tabs 224, 226 and the transverse stiffeners 220 are thus able to grow and shrink transversely within the pockets 300 to accommodate thermal growth without causing stresses. At the same time, the leading and trailing edge inwardly bent ribs 96, 97 and the leading and trailing edge outwardly bent ribs 94, 95 of the inwardly and outwardly bent segments 182, 184 slide into the forward and aft slots 282, 284 respectively until the ribs contact the bridge 291 of the retainer base 280. Longitudinally spaced apart distal ends of the retainers 180 are spot welded to the panel bodies 106 of the adjacent inwardly and outwardly bent segments 182, 184 as illustrated by spot welds 181 in FIGS. 3, 4, 6 and 13.

Referring to FIGS. 5 and 9, the inwardly bent over first and second segment tabs 88, 89 are then bent inwardly over at the acute angle 188 with the panel body 106 along tab lines 310 of the blank 196. The tab lines 310 are transversely spaced apart a distance 312 from the forward and aft tabs 190, 192 forming a setback 314 (illustrated in FIG. 13) so that sufficient room is available to accommodate a width W of the bridge 291, thus, allowing the retainer 180 to bridge adjacent inwardly and outwardly bent segments 182, 184. Then the spine 67, with the basesheet 52 mounted to the spine 67, is mounted to the backbone 50 as illustrated in FIG. 6. The spine 67 is slid forward such that the forward and center retaining hooks 212, 214 of the forward and center hangers 70, 72 are slid onto and frictionally engage the forward and center shelves 250, 254 at the forward and center attachment locations 160, 162, respectively. The first aperture 262 of lug portion 76 of the aft hanger 74 is then aligned with second apertures 263 in the clevis 264 of the backbone 50 at the aft attachment location 164. The spine 67 is then secured to backbone 50 by screws through the first aperture 262 of lug portion 76 of the aft hanger 74 and the second apertures 263 in the clevis 264 of the backbone 50 lugs or other means for attaching the aft hanger to the backbone.

Figure 17:
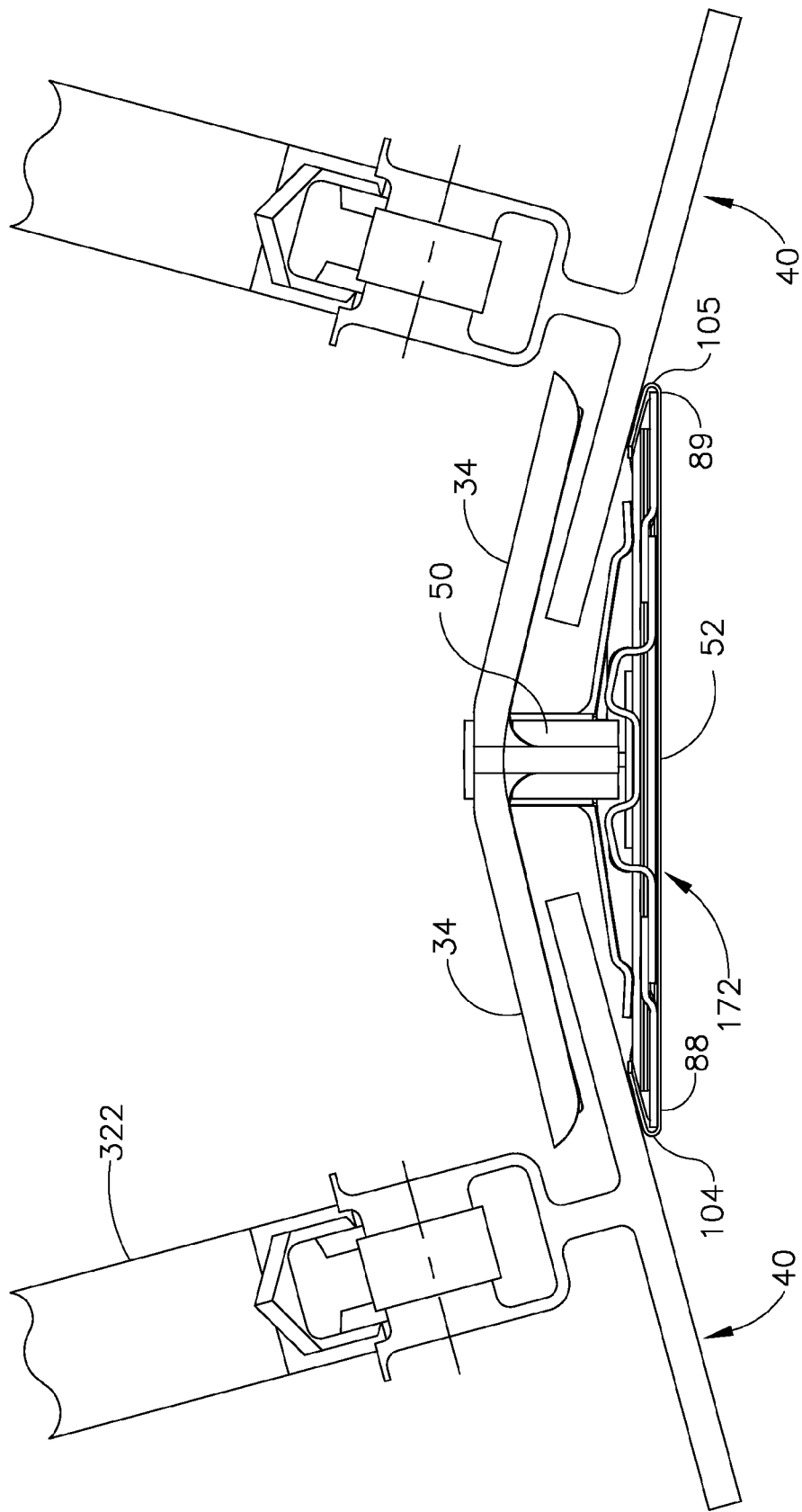
FIG. 17 is a diagrammatical cross-sectional view illustration of the base sheet sealingly engaged with the flaps in illustrated FIG. 2.

The angel wing hangers 34 are mounted to the backbone 50 and supported by the adjacent divergent flaps 40 as illustrated in FIG. 1 and further in FIG. 17. The struts 322 are connected to the divergent flap 40 as illustrated in FIGS. 1, 2, and 17. The divergent flaps 40 on each side of the divergent seal 172 are trapped by angel wings 34, mounted to the backbone 50, and the segmented basesheet 52 of the divergent seal 172 as illustrated in FIGS. 2 and 17. Thus, the inwardly bent over first and second segment tabs 88, 89 along the first and second segment side edges 104, 105 are spring loaded or biased radially outwardly against the adjacent flaps 40 such that they engage and seal against the adjacent flaps 40.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

The invention claimed is:

1. An aircraft gas turbine engine exhaust nozzle basesheet comprising:
    a longitudinally extending plurality of basesheet segments,
    each of the basesheet segments including a panel body extending between longitudinally spaced apart segment leading and trailing edges and transversely spaced apart first and second segment side edges,
    segmented first and second basesheet side edges extending longitudinally between spaced apart basesheet leading and trailing edges of the basesheet,
    the first and second basesheet side edges comprising the first and second segment side edges respectively,
    slidable sealing joints with slidingly un-restrained center surfaces at adjacent ones of the segment leading and trailing edges,
    slidably sealingly engaged overlapping flanges at the adjacent ones of the segment leading and trailing edges,
    the slidingly un-restrained center surfaces being located on the overlapping flanges, and
    tacked together transversely spaced apart first and second distal ends of the overlapping flanges.

2. An aircraft gas turbine engine exhaust nozzle basesheet as claimed in claim 1 further comprising:
    leading and trailing edge ribs supporting the overlapping flanges at the adjacent ones of the segment leading and trailing edges respectively,
    retainers including a substantially flat retainer base with longitudinally spaced apart and transversely extending forward and aft slits, and
    forward and aft pairs of adjacent ones of the leading and trailing edge ribs received within and clipped together by the forward and aft slits respectively.

3. An aircraft gas turbine engine exhaust nozzle basesheet as claimed in claim 2 further comprising gaps between the adjacent ones of the leading and trailing edge ribs.

4. An aircraft gas turbine engine exhaust nozzle basesheet as claimed in claim 2 further comprising inwardly bent over first and second segment tabs along the first and second segment side edges respectively.

5. An aircraft gas turbine engine exhaust nozzle basesheet assembly comprising:
    a longitudinally extending basesheet mounted to a longitudinally extending spine,
    the basesheet including a longitudinally extending plurality of basesheet segments including inwardly and outwardly bent segments,
    the inwardly and outwardly bent segments including panel bodies extending longitudinally between longitudinally spaced apart segment leading and trailing edges and transversely between transversely spaced apart first and second segment side edges,
    segmented first and second basesheet side edges comprising the first and second segment side edges respectively, slidable sealing joints at adjacent ones of the segment leading and trailing edges,
the slidable sealing joints including slidably sealingly engaged overlapping flanges having slidingly un-restrained center surfaces at the adjacent ones of the segment leading and trailing edges,
tacked together transversely spaced apart first and second distal ends of the overlapping flanges,
the spine having transverse stiffeners with first and second stiffener distal ends attached to longitudinally spaced apart sets of transversely extending first and second spine tabs of the spine, and
the first and second spine tabs secured to a first plurality of the panel bodies.

6. An assembly as claimed in claim 5 further comprising:
the overlapping flanges including inwardly bent over flanges supported by leading and trailing edge inwardly bent ribs of the inwardly bent segments and outwardly bent over flanges supported by leading and trailing edge outwardly bent ribs of the outwardly bent segments,
the outwardly bent over flanges overlapping the inwardly bent over flanges,
retainers including a substantially flat retainer base with longitudinally spaced apart and transversely extending forward and aft slits,
an island between the forward and aft slits extending transversely away from a bridge of the retainer base,
adjacent ones of the leading edge inwardly bent ribs and the trailing edge outwardly bent ribs received within and clipped together by the forward slits,
adjacent ones of the trailing edge inwardly bent ribs and the leading edge outwardly bent ribs received within and clipped together by the aft slits, and
the first and second stiffener distal ends and the sets of first and second spine tabs trapped in pockets between the islands, the retainers, and the first plurality of the panel bodies.

7. An aircraft gas turbine engine exhaust nozzle basesheet as claimed in claim 6 further comprising gaps between the adjacent ones of the leading and trailing edge ribs.

8. An assembly as claimed in claim 6 further comprising inwardly bent over first and second segment tabs along the first and second segment side edges.

9. An assembly as claimed in claim 8 further comprising the first plurality of the panel bodies belonging to at least some of the inwardly bent segments and pockets being between raised indentations of inboard end portions of the islands and the first plurality of the panel bodies.

10. An assembly as claimed in claim 8 further comprising the inwardly bent over first and second segment tabs being bent inwardly over and forming acute angles with the panel bodies along the first and second segment side edges.

11. An assembly as claimed in claim 5 further comprising:
the spine having longitudinally spaced apart forward, center, and aft slots,
forward, center, and aft hangers having lug portions extending substantially perpendicularly upwardly from hanger heads of the forward, center, and aft hangers,
the lug portions of the forward, center, and aft hangers extending through the forward, center, and aft slots respectively, and
the hanger heads being disposed and retained between the basesheet and the spine.

12. An assembly as claimed in claim 11 further comprising the lug portions of the forward and center hangers having forward and center retaining hooks respectively.

13. An assembly as claimed in claim 11 further comprising:
the overlapping flanges including inwardly bent over flanges supported by leading and trailing edge inwardly bent ribs of the inwardly bent segments and outwardly bent over flanges supported by leading and trailing edge outwardly bent ribs of the outwardly bent segments,
the outwardly bent over flanges overlapping the inwardly bent over flanges,
retainers including a substantially flat retainer base with longitudinally spaced apart and transversely extending forward and aft slits,
an island between the forward and aft slits extending transversely away from a bridge of the retainer base,
adjacent ones of the leading edge inwardly bent ribs and the trailing edge outwardly bent ribs received within and clipped together by the forward slits,
adjacent ones of the trailing edge inwardly bent ribs and the leading edge outwardly bent ribs received within and clipped together by the aft slits, and
the first and second stiffener distal ends and the sets of first and second spine tabs trapped in pockets between the islands the retainers and the first plurality of the panel bodies.

14. An assembly as claimed in claim 13 further comprising inwardly bent over first and second segment tabs along the first and second segment side edges.

15. An assembly as claimed in claim 14 further comprising the first plurality of the panel bodies belonging to at least some of the inwardly bent segments and pockets being between raised indentations of inboard end portions of the islands and the first plurality of the panel bodies.

16. An assembly as claimed in claim 14 further comprising the inwardly bent over first and second segment tabs being bent inwardly over and forming acute angles with the panel bodies along the first and second segment side edges.

17. An aircraft gas turbine engine exhaust nozzle comprising:
divergent seals sealingly engaging divergent flaps,
each of the divergent seals having a basesheet assembly,
the basesheet assembly including a longitudinally extending basesheet mounted to a longitudinally extending spine and the spine mounted to a longitudinally extending backbone,
the basesheet including a longitudinally extending plurality of basesheet segments including inwardly and outwardly bent segments,
the inwardly and outwardly bent segments including panel bodies extending longitudinally between longitudinally spaced apart segment leading and trailing edges and transversely between transversely spaced apart first and second segment side edges,
segmented first and second basesheet side edges comprising the first and second segment side edges respectively,
slidable sealing joints at adjacent ones of the segment leading and trailing edges,
the slidable sealing joints including slidably sealingly engaged overlapping flanges having slidingly un-restrained center surfaces at the adjacent ones of the segment leading and trailing edges,
tacked together transversely spaced apart first and second distal ends of the overlapping flanges,
the spine having transverse stiffeners with first and second stiffener distal ends attached to longitudinally spaced apart sets of transversely extending first and second spine tabs of the spine, and
the first and second spine tabs secured to a first plurality of the panel bodies.

18. A nozzle as claimed in claim 17 further comprising:
the overlapping flanges including inwardly bent over flanges supported by leading and trailing edge inwardly bent ribs of the inwardly bent segments and outwardly bent over flanges supported by leading and trailing edge outwardly bent ribs of the outwardly bent segments,
the outwardly bent over flanges overlapping the inwardly bent over flanges,
retainers including a substantially flat retainer base with longitudinally spaced apart and transversely extending forward and aft slits,
an island between the forward and aft slits extending transversely away from a bridge of the retainer base,
adjacent ones of the leading edge inwardly bent ribs and the trailing edge outwardly bent ribs received within and clipped together by the forward slits,
adjacent ones of the trailing edge inwardly bent ribs and the leading edge outwardly bent ribs received within and clipped together by the aft slits, and
the first and second stiffener distal ends and the sets of first and second spine tabs trapped in pockets between the islands the retainers and the first plurality of the panel bodies.

19. A nozzle as claimed in claim 18 further comprising gaps between the adjacent ones of the leading and trailing edge ribs.

20. A nozzle as claimed in claim 19 further comprising the inwardly bent over first and second segment tabs being bent inwardly over and forming acute angles with the panel bodies along the first and second segment side edges.

21. A nozzle as claimed in claim 20 further comprising at least some of the inwardly bent segments including the first plurality of the panel bodies and pockets being between raised indentations of inboard end portions of the islands and the first plurality of the panel bodies.

22. A nozzle as claimed in claim 20 further comprising longitudinally spaced apart sets of forward and aft vibration dampeners extending transversely away from and outboard with respect to the backbone and sprung to engage a back side of the basesheet assembly or the basesheet.

23. A nozzle as claimed in claim 21 further comprising:
the spine having longitudinally spaced apart forward, center, and aft slots,
forward, center, and aft hangers having lug portions extending substantially perpendicularly upwardly from hanger heads of the forward, center, and aft hangers,
the lug portions of the forward, center, and aft hangers extending through the forward, center, and aft slots respectively, and
the hanger heads being disposed and retained between the basesheet and the spine.

24. A nozzle as claimed in claim 23 further comprising:
the lug portions of the forward and center hangers having forward and center retaining hooks respectively,
the backbone having longitudinally spaced apart forward, center, and aft attachment locations,
the forward and center retaining hooks engaging forward and center shelves at the forward and center attachment locations, and
the lug portion of the aft hanger connected to the backbone at the aft attachment location.

* * * * *